R. M. BAIRD.
DEMOUNTABLE RIM LOCK FOR VEHICLE WHEELS.
APPLICATION FILED JULY 26, 1918.
1,390,186.
Patented Sept. 6, 1921.
2 SHEETS—SHEET 1.
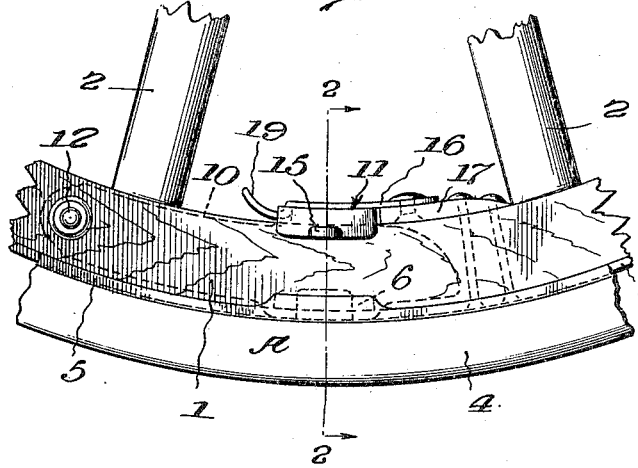
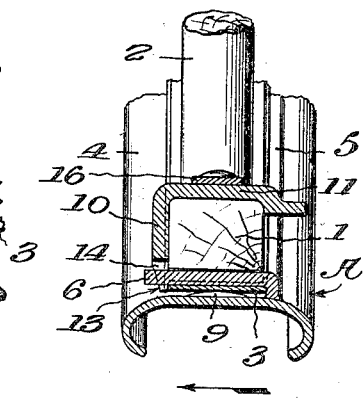
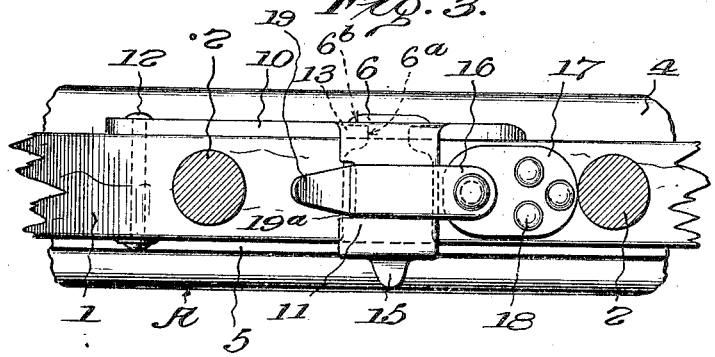
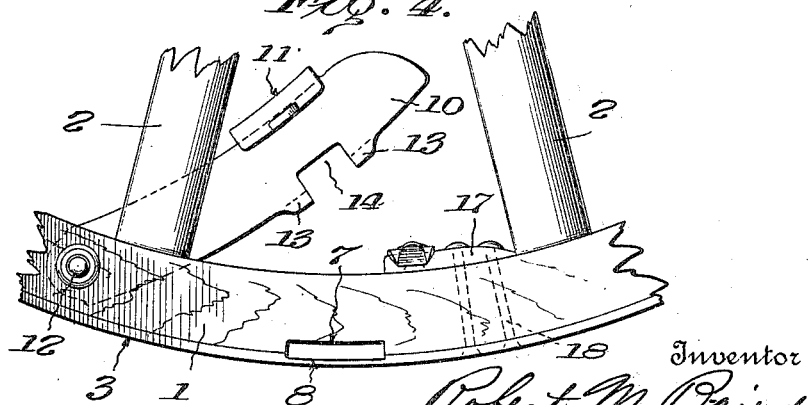
Inventor
Robert M. Baird,
By Clark, Prentis & Clark,
Attorneys.

R. M. BAIRD.
DEMOUNTABLE RIM LOCK FOR VEHICLE WHEELS.
APPLICATION FILED JULY 26, 1918.
1,390,186.
Patented Sept. 6, 1921.
2 SHEETS—SHEET 2.
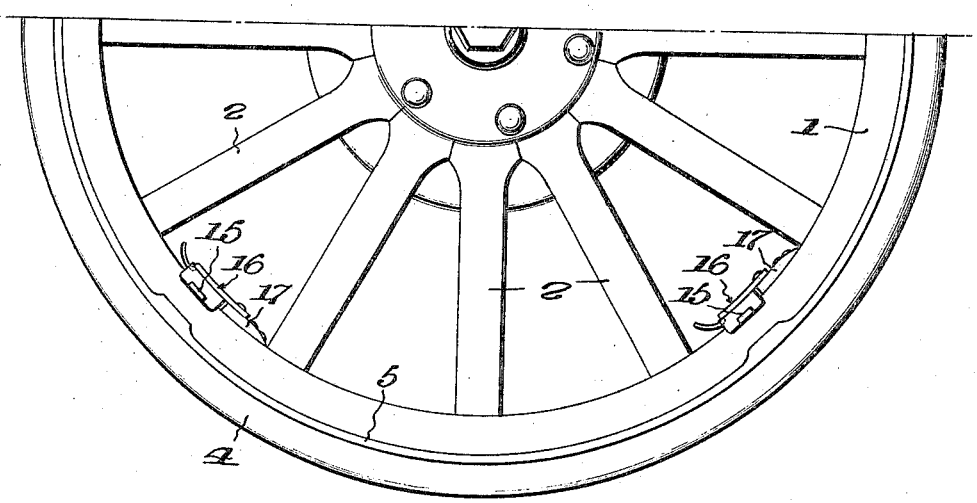
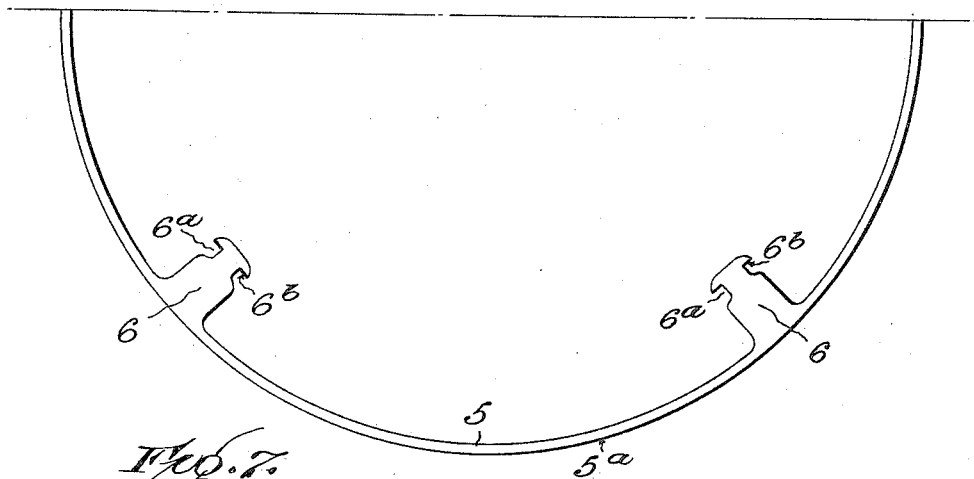
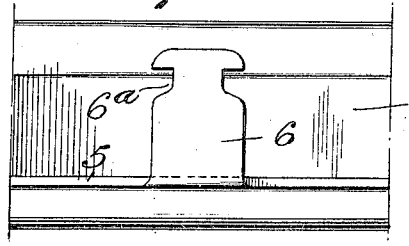
Inventor
Robert M. Baird,
By Clark, Prentis & Clark,
Attorneys.

ated to be slipped on and off of the felly
UNITED STATES PATENT OFFICE.

ROBERT M. BAIRD, OF SALT LAKE CITY, UTAH.

DEMOUNTABLE-RIM LOCK FOR VEHICLE-WHEELS.

1,390,186. Specification of Letters Patent. Patented Sept. 6, 1921.

Application filed July 26, 1918. Serial No. 246,822.

*To all whom it may concern:*

Be it known that I, ROBERT M. BAIRD, a citizen of the United States, residing at Salt Lake City, in the county of Salt Lake and State of Utah, have invented new and useful Improvements in Demountable-Rim Locks for Vehicle-Wheels, of which the following is a specification.

This invention relates to vehicle wheel rims and pertains particularly to demountable rims for motor cars and the fastening devices therefor.

One object of the invention is to provide a demountable rim which may be easily and quickly removed from or attached to the vehicle wheel without the use of tools.

Another object of the invention is to provide a simple fastening device which may be attached to any motor car wheel and which will lock the demountable rim in place on the wheel felly in such a way as to absolutely prevent axial or circumferential movement of the rim on the felly.

A further object of the invention is the construction and arrangement of the fastening devices on the demountable rim and the wheel felly so as to be substantially invisible from the outside of the wheel.

Still another and more specific object of the invention is to provide a fastening device for demountable rims wherein the parts are constructed with a view to reducing the cost of manufacture, and at the same time retain those features by which safety, durability, and ease of assembly and installation are secured.

Further features of the invention and structural details will be described in the following specification and claims and illustrated in the accompanying drawings, in which:—

Figure 1 represents a segment of a vehicle wheel illustrating the position of the demountable rim on the wheel felly and one of the fastening devices in locked position.

Fig. 2 represents a sectional view taken on the line 2—2 of Fig. 1.

Fig. 3 represents a top plan view of Fig. 1.

Fig. 4 represents a segment of a vehicle wheel with the demountable rim removed and the fastening device in an unlocked position.

Fig. 5 represents a side elevation of a vehicle wheel illustrating the outside appearance of a wheel and a demountable rim fastened thereto by means of my fastening devices.

Fig. 6 represents a plan view of the metal ring or band and the retaining lugs in the plane of the ring.

Fig. 7 represents a fragmentary view of the demountable rim with the ring fastened thereto, showing one of the retaining lugs bent into operative position.

The same reference numerals designate like parts throughout the various figures.

Referring to the drawings, 1 represents the felly of a wheel having spokes 2 and a circumferential band 3 tightly inclosing the felly. The usual demountable rim 4 is adapted to be slipped on and off of the felly 1 and retained in position thereon by fastening means hereinafter described. Fastened to the inner surface of the rim 4 near the outer edge A is a continuous metal ring or band 5 provided at spaced intervals with retaining lugs 6. These retaining lugs 6 project inwardly from the outer edge A of the rim 4 and extend parallel to and slightly spaced from the inner surface of the rim 4 to provide sufficient space for the reception of the felly band as will be described. The metal band 5 is preferably stamped from malleable steel with retaining lugs 6 integral therewith and in the plane of the metal (see Fig. 6). The outer circumferential edge 5ᵃ of the metal band 5 is rigidly attached to the inner surface of the rim 4 in any suitable manner but preferably it is welded thereon, thus making a neat and inconspicuous appearance. The retaining lugs 6 are then bent to their operative position as shown in dotted lines in Fig. 7.

The felly 1 is provided at spaced intervals with slots or grooves 7 corresponding in number to the lugs 6. When the demountable rim 4 is slipped over the felly 1 and felly band 3 the retaining lugs 6 pass through the grooves 7 and fit snugly into those grooves and grooves 8 cut in the felly band 3, and located opposite said grooves 7. This construction eliminates all circumferential strain from the locking members hereinafter described. The felly band 3 rests on the usual spacing heads 9 fastened at suitable intervals on the inner surface of the rim 4, which heads 9 act to space the demountable rim concentrically with respect to the felly band. The inner edge of the band 5 engages with the outer edge of the felly band 3 and limits the inward axial movement of the demountable rim 4 on the felly.

Referring in detail to the construction of the locking members it will be observed that the members consist of a side plate 10, and a cross plate 11 formed integrally therewith and extending at right angles thereto. The plate 10 is pivotally mounted on the inner side of the felly 1 by means of a bolt or hinge member 12 and conforms to the arc of the felly thus being substantially hidden from view from the outside of the wheel. Locking projections 13 extend from the lower edge of the side plates 10 on either side of a notch 14. When the side plate 10 is in its locked position (Figs. 1 and 2), the locking projections 13 fit snugly into notches 6ª cut in the inner or locking end of the retaining lug 6. The outer surface 13ª of each of the locking projections 13 is beveled and engages the edges 6ᵇ of the retaining lugs 6, thus firmly wedging the demountable rim 4 onto the felly 1 against axial movement. Each of the plates 10 is held in locked position by means of a spring member bearing upon the cross plate 11. A finger grip 15 projects outwardly from the cross plate 11 for use in raising and lowering the locking mechanism.

A simple and positive fastening means is provided for holding the locking projections 13 in locked position and for effectively preventing any rattle or noise such as is often found in fastening devices for demountable rims. This fastening device consists of a spring member 16 pivotally mounted on a block 17 suitably fastened to the inner circumferential surface of the felly, as by means of the bolts 18. The spring member 16 is provided at its free end with a catch member 19 which engages a notch 19ª in the cross plate 11. The catch 19 being upwardly curved at its end, provides an easy and convenient means for moving the spring member 16 into and out of engagement with the cross plate 11.

The steps required in removing the demountable rim 4 from the wheel are extremely simple and quickly accomplished. The spring members 16 are first lifted by means of the catch members 19 and swung out of engagement with the cross plates 11. (See Fig. 4.) The locking projections 13 are then moved out of engagement with the retaining lugs 6 by means of the projecting finger grip 15 and the rim 4 is ready to be removed.

While in the foregoing there has been shown and described the preferred embodiment of this invention, it is to be understood that such changes may be made in the combination and arrangement of parts as will fall within the spirit and scope of the invention as claimed.

What I claim is:—

1. The combination with a wheel felly having a plurality of axially extending openings therethrough, of a demountable rim having a plurality of retaining lugs extending axially through said openings, and of such length as to project beyond the side face of said felly, and locking members permanently attached to said side face of the felly disposed to engage such projecting portions of said lugs.

2. The combination with a wheel felly having a plurality of axially extending openings therethrough, of a demountable rim having a plurality of retaining lugs extending axially through said openings, and of such length as to project beyond the side face of said felly, locking members pivoted to said side face of the felly, disposed to engage such projecting portions of said lugs, and means for holding said locking members in engagement with the lugs.

3. In combination, a wheel felly having a series of axially extending grooves extending through the periphery thereof, a circumferential felly band inclosing said felly and having a series of axially extending grooves extending through the axial side thereof and positioned to fit over and register with the grooves in said felly, a demountable rim thereon, retaining lugs on said rim extending axially through said grooves in said felly and in said felly band, locking members on said felly engaging said retaining lugs, and means for holding said locking members in engagement with said retaining lugs.

4. In combination, a wheel structure comprising a felly and band and having a plurality of openings extending axially therethrough, adjacent the band, said band itself forming the outer wall of said openings, a demountable rim having an inner face adapted to fit over said band and provided with a plurality of retaining lugs disposed parallel with, and spaced from such inner face, said lugs being of greater length than the width of the wheel structure and being constructed to enter said openings between the said felly and band, whereby said band is held between the lugs and said inner face of the rim, and means carried by the wheel structure for engaging the ends of said retaining lugs to lock the rim in position.

5. The combination with a wheel felly having a plurality of openings extending axially therethrough, of a demountable rim thereon having a plurality of retaining lugs disposed to pass through said openings from one side and constructed to project beyond the opposite side face of the felly, and locking means adapted to engage the projecting ends of said lugs, said means comprising a latch pivoted to the side face of the felly adjacent each lug and lying radially beyond the inner face of the felly, whereby it is substantially concealed by the felly when viewed from the other side.

6. In combination, a wheel felly, a circumferential felly band tightly inclosing said felly, a demountable rim thereon, a circular metal band carried by said rim, and engaging the outer surface of said felly band, retaining lugs carried by said metal band extending axially through said felly band and provided with notches in their free ends, side plate members pivotally mounted on said felly having locking projections integral therewith engaging the notches in said retaining members, transverse cross plate members carried by said side members and engaging said felly, and spring members pivotally mounted on said felly and engaging said cross plate members.

7. In combination, a wheel felly, a circumferential felly band inclosing said felly, a demountable rim thereon, retaining lugs on said demountable rim secured on one side thereof, and extending axially through said felly band, locking members pivotally mounted on said last mentioned side and engaging said lugs, transverse cross plate members integral with said locking members embracing the axial side of said felly, and spring members pivotally mounted on said felly whereby said members can be moved into and out of engagement with said cross plate members.

8. In an article of manufacture, a wheel rim, a circular band formed from sheet material with lugs integral therewith, the said band being fastened near one edge of the inner surface of said rim and said lugs being bent inwardly across said inner surface and spaced from said surface.

9. In an article of manufacture, a wheel rim, a circular band formed from sheet material with lugs integral therewith, and fastening means carried at the free ends of said lugs, the said band being fastened near the edge of the inner surface of the rim and said lugs being bent inwardly across said inner surface and spaced from said surface.

In testimony whereof I affix my signature.

ROBERT M. BAIRD.

Witnesses:
W. ECCLES BAIRD,
L. C. POND.